3,090,768
POLYVINYLCHLORIDE-CHLORINATED ISOOLE-
FIN-MULTIOLEFIN COPOLYMER BLEND AND
METHOD OF MAKING SAME
Richard Louia Ray and Edward Allen Hunter, Baton
Rouge, La., and John L. Ernst, Westfield, N.J., assign-
ors to Esso Research and Engineering Company, a cor-
poration of Delaware
No Drawing. Filed May 26, 1958, Ser. No. 737,498
7 Claims. (Cl. 260—45.5)

This invention relates to blends of halogenated iso-olefin-multiolefin copolymers, particularly brominated or even more especially chlorinated butyl rubber with polyvinylchloride and more particularly relates to producing flexible, tough, high-impact-strength polyvinylchloride by incorporating minor proportions of chlorinated butyl rubber therein.

In general, polyvinylchloride is produced by polymerizing the vinylchloride monomer, with agitation, suspended in water (i.e., in an aqueous medium) by means of a peroxide type catalyst such as hydrogen peroxide, benzoyl peroxide, ditertiary butyl peroxide, cumene hydroperoxide or the like at temperatures of between about −50° C. to +250° C. and preferably between −20° C. and +150° C. Alternatively, polyvinylchloride may be produced from the vinylchloride monomer by emulsion polymerization in the presence of suitable emulsifying agents such as sodium laurate, ammonium naphthalene sulfonate and sodium lauryl sulfate. Other than this, in this latter emulsion polymerization, the same general contents and catalysts are employed as in suspension polymerization. In either case polyvinylchloride is produced having a specific viscosity of between about 0.70 and 1.40 (ASTM 1243–52T). Alternatively, copolymers of about 1 to 20, preferably 2 to 10% of vinyl acetate, with the balance being vinyl chloride, may also be used (e.g., 5% vinyl acetate and 95% vinylchloride).

In practicing the present invention, about 100 parts by weight of such polyvinylchloride and such copolymers of vinyl chloride with vinyl acetate as above are blended with about 0.5–50, advantageously about 1–40, and preferably about 3–30 parts by weight of chlorinated butyl rubber with the preferable addition of about 0.5–5 parts by weight of a suitable stabilizer such as dibutyl tin dilaurate or the like with or without about 0.25–3 parts by weight of a suitable lubricant such as stearic acid or N-N′-ethylene bisstearamide and subsequently cured at a temperature between 275 and 450° F. for 0.1 to 100 minutes, preferably 300 to 400° F. for 1 to 30 minutes.

The chlorinated butyl rubber to be used may be made by mild chlorination of butyl rubber, which is a high molecular weight rubbery copolymer of an isoolefin and a multiolefin, generally having a Staudinger molecular weight of about 20,000 to 100,000 and an iodine number of about 0.5–50 (Wijs).

Copolymers of the above general type, especially where the copolymer contains about 85 to 99.5% (preferably about 95 to 99.5%) of a $C_4$ to $C_7$ isoolefin such as isobutylene with about 15 to 0.5% (preferably about 5 to 0.5 weight percent) of a multiolefin of about 4 to 14, preferably about 4 to 6 carbon atoms (such as isoprene, myrcene, allo-ocymene, etc.) are commonly referred to in patents and literature as "butyl rubber" or GR-I rubber (Government Rubber-Isobutylene). The preparation and uses of butyl type rubbers are described in U.S. Patent 2,356,128 to Thomas et al. and also in other patents as well as in literature, such as in the book "Synthetic Rubber" by G. S. Whitby (1954 edition by John Wiley & Sons, Inc.), pages 608–609, etc. Preferably, the butyl rubber comprises the reaction product of isobutylene with a conjugated diolefin such as isoprene, butadiene, dimethyl butadiene, piperylene, etc. The reaction product of isobutylene and isoprene is preferred.

The above-described butyl rubber is then chlorinated in a manner which does not degrade the molecular weight thereof, but sufficiently to produce rubber which retains its tensile strength upon heat-aging. The chlorination is desirably carried out so as to make the resultant chlorinated butyl rubber contain about at least 0.5 weight percent (preferably at least about 1.0 weight percent) combined chlorine, but not more than about "X" weight percent combined chlorine wherein:

$$X = \frac{35.46L}{(100-L)M_1 + L(M_2 + 35.46)} \times 100$$

and:

$L$=mole percent of the multiolefin in the polymer
$M_1$=molecular weight of the isoolefin
$M_2$=molecular weight of the multiolefin
35.46=atomic weight of chlorine Restated, there should be at least about 0.5 weight percent of combined chlorine in the polymer but not more than about 1 atom of chlorine combined in the polymer per molecule of multiolefin present therein; i.e., not more than about 1 atom of combined chlorine per double bond in the polymer.

Suitable chlorinating agents which may be employed are molecular chlorine, alkali metal hypochlorites (preferably sodium hypochlorite), sulfur chlorides (particularly oxygenated sulfur chlorides), iodine chloride, pyridinium chloride perchloride, N-chlorosuccinimide, alpha-chloroaceto-acetanilide, trichlorophenol chloride, N,N′-dimethyl dichlorohydantoin, N-chloroacetamide, beta-chloro-methyl phthalimide, and other common chlorinating agents. The preferred chlorinating agents are molecular chlorine, sulfuryl chloride, iodine monochloride, chlorohydantoins and related materials. The chlorination is advantageously conducted at above 0° to about 100° C. and preferably to about 20° to 70° C. for about one minute to several hours. However, the temperatures and times are regulated to chlorinate the rubbery copolymer to the extent above-mentioned.

The chlorination may be accomplished in various ways. One process comprises preparing a solution of the copolymer as above, in a suitable inert liquid organic solvent such as an inert hydrocarbon or advantageously halogenated derivatives of saturated hydrocarbons, examples of which are hexane, heptane, naphtha, kerosene, straight run mineral spirits, benzene, toluene, chlorobenzene, chloroform, trichloroethane, carbon tetrachloride, etc., and adding thereto chlorine or other chlorinating agent, preferably in solution, such as dissolved in an alkyl chloride, carbon tetrachloride, etc. Other variations comprise employing the chlorinating agent in the form of a gas, and contacting the gas with either a solution of the copolymer or the solid copolymer per se. If elemental chlorine is employed, it may advantageously be added as an alkyl chloride or carbon tetrachloride solution. The use of elevated or depressed pressures is optional since atmospheric pressure is satisfactory although the pressure may vary, depending upon the foregoing temperatures and times from about 1 to 500 p.s.i.a.

The concentration of the butyl rubber in the solvent will depend upon the type of reactor, molecular weight of the butyl rubber, etc. In general, the concentration of a butyl rubber having a viscosity average molecular weight of about 200,000 to about 1,000,000, if the solvent is a substantially inert hydrocarbon, will be between 1 and 80% by weight, preferably about 5 to 50%.

The chlorine gas may also be diluted with up to about 20 times its volume, preferably about 0.1 to 5.0 times its volume of an inert gas such as nitrogen, methane, ethane, carbon dioxide, etc.

In chlorinating the butyl rubber in batch procedure, gaseous chlorine may be added relatively slowly to a preformed solution of the butyl rubber with agitation. The chlorine is advantageously added over a period of about 1 to 30 minutes depending upon the degree of agitation.

For a continuous process, the preformed butyl rubber solution and gaseous elemental chlorine are advantageously contacted in an orifice mixing zone or preferably a multiple orifice mixing zone of any commercially available type wherein the butyl rubber solution passes consecutively through a plurality of orifices. The chlorine gas is advantageously bubbled into the butyl rubber solution at one or more points, however, preferably at least at the first orifice passed through by the butyl rubber solution. Alternatively a plurality of agitated reaction zones in series may be employed, wherein the chlorine is added to the first zone or the process staged, so as to increase the chlorine content in each zone to the final chlorine concentration desired.

Regardless of the type of chlorination process, the amount of gaseous chlorine added to butyl rubber dissolved in a completely inert hydrocarbon is approximately twice that which is desired to be combined with the butyl polymer, since for one mole of chlorine, one atom combines with the polymer and the other atom is evolved as hydrogen chloride.

The resulting chlorinated butyl rubber polymer may be recovered in various manners. The polymer may be precipitated with acetone or an alcohol or any other known non-solvent for the rubber and dried under about 1 to 760 millimeters or higher of mercury pressure absolute at about 0° to 180° C., preferably about 50° to 150° C., e.g., 70° C. Other methods of recovering the chlorinated butyl polymer from the hydrocarbon solution of the same are by conventional spray or drum drying techniques. Alternatively the chlorinated butyl rubber-containing solution may be injected into a vessel containing agitated water heated to a temperature sufficient to flash off the hydrocarbon solvent and form an aqueous slurry of the chlorinated butyl rubber. The chlorinated butyl rubber may then be separated from this slurry by filtration, dried and recovered as a "crumb" or as a dense sheet or slab by conventional milling and/or extruding procedures.

The resulting chlorinated butyl rubber polymer is similar in some respects to ordinary butyl rubber as to rubbery characteristics. It also has the property of being curable with zinc oxide and/or sulfur with or without added vulcanization accelerators.

In order to more fully illustrate the present invention, the following experimental data are given:

*Example I*

Polyvinylchloride (Geon 103–EP) and a chlorinated isobutylene-isoprene butyl rubber copolymer having, after chlorination, a Staudinger molecular weight of 42,000, a Mooney viscosity (212° F. at 8 minutes) of 55.0, a mole percent unsaturation of 1.00, and a combined chlorine content of 1.2 weight percent were compounded in accordance with the following formulation:

| Component: | Parts by weight |
|---|---|
| Polyvinylchloride | 100 |
| Dibutyl tin dilaurate | 3 |
| Lubricant (stearic acid) | 0.5 |
| Chlorinated butyl rubber | 5.0 |

The ingredients were mixed and fluxed on a hot roll mill for 10 minutes at 320° F. The resulting sheet formed was cut into 1-inch squares and press polished on a heated hydraulic press at 340° F. for 1 minute and under a pressure of 10,000 p.s.i. The flow characteristics and welding characteristics were completely adequate to yield a uniform and homogeneous test pad. Neither staining of the mold nor sticking to the mold were observed. Also, no weld marks or discontinuities of the test pad could be seen. The transparenceity of the test pad was of such a degree as to show an acceptably high degree of compatibility between the polyvinylchloride and the chlorinated butyl rubber. A thin film 2 mils thick was completely transparent.

*Example II*

The same general procedure as in Example I was repeated except that 10 parts of chlorinated butyl rubber were employed. In this case both the resulting pad and mold flashings demonstrated that the flow and melt characteristics of the mixed polymers were excellent. Uniformity or homogeneity of the pad was also very good with no signs of poor welding. A thin film 2 mils thick showed a high degree of resistance to tearing. Furthermore, the test pad was observed to have high impact strength; namely, an impact strength 5 times better than unmodified polyvinyl chloride pads. Similar tests with unchlorinated butyl rubber gave incompatible non-homogeneous mixtures. It was also noted that the presence of the halogenated butyl rubber gave excellent flexibility to the polyvinylchloride and caused a reduction in needed plasticizers.

Resort may be had to modifications and variations of the disclosed embodiments without departing from the spirit of the invention or the scope of the appended claims.

What is claimed is:

1. A composition comprising about 100 parts by weight of polyvinylchloride and about 0.5 to 50 parts by weight of a chlorinated rubbery copolymer of 85 to 99.5% of an isoolefin with 0.5 to 15% of a multiolefin, said copolymer containing at least 0.5 weight percent chlorine incorporated in its structure by a substitution-reaction but not more than about 1 atom of chlorine per double bond in the copolymer, said composition being capable of being cured at elevated temperatures to provide an end product with increased impact strength.

2. A composition of claim 1 containing about 3 to 30 parts by weight of the chlorinated rubbery isoolefin-multiolefin copolymer.

3. A process which comprises heating at a temperature level of between about 275° and 450° F. for between about 0.1 and 100 minutes, the composition of claim 5 whereby to obtain a uniform and homogeneous substantially transparent resinous material.

4. A process of claim 3 in which the curing conditions are for 1 to 30 minutes at between about 300–400° F.

5. A process which comprises blending 100 parts by weight of polyvinylchloride with 0.5 to 50 parts by weight of a chlorinated copolymer of 85 to 99.5% of an isoolefin with 0.5 to 15% of a multiolefin containing at least 0.5 weight percent chlorine incorporated in its structure by a substitution-reaction, but not more than about 1 combined atom of chlorine per double bond in the copolymer; and curing said blend at elevated temperatures to provide an end product therefrom with increased impact strength.

6. A composition comprising 100 parts of polyvinyl chloride and 0.5 to 50 parts by weight of a chlorinated rubbery copolymer of 85 to 99.5% of an isoolefin with 0.5 to 15% of a multiolefin, containing at least 0.5 weight percent chlorine incorporated in its structure by a substitution-reaction, but not more than about 1 combined atom of chlorine per double bond in the copolymer; said composition have been cured at a temperature between 275 and 450° F. for 0.1 to 100 minutes in the presence of dibutyl tin dilaurate as a stabilizer and in the presence of a lubricant selected from the group consisting of stearic acid and N-N'-ethylene bis-stearamide to provide an end product therefrom with increased impact strength.

7. A process which comprises blending 100 parts of a polyvinyl chloride with 0.5 to 15 parts by weight of a chlorinated rubbery copolymer of 85 to 99.5% of an isoolefin with 0.5 to 15% of a multiolefin, containing at least 0.5 weight percent chlorine incorporated in its structure by a substitution-reaction, but not more than about 1 combined atom of chlorine per double bond in the copolymer; and curing said blend at a temperature between 275 and 450° F. for 0.1 to 100 minutes in the presence of dibutyl tin dilaurate as a stabilizer and in the presence of a lubricant selected from the group consisting of stearic acid and N-N'-ethylene bis-stearamide to provide an end product therefrom with increased impact strength.

References Cited in the file of this patent

UNITED STATES PATENTS

| | | |
|---|---|---|
| 2,337,424 | Stoner et al. | Dec. 21, 1943 |
| 2,732,354 | Morrissey | Jan. 24, 1956 |
| 2,755,271 | Tawney et al. | July 17, 1956 |
| 2,780,615 | Tawney et al. | Feb. 5, 1957 |
| 2,808,387 | Parks et al. | Oct. 1, 1957 |
| 2,901,458 | Banes et al. | Aug. 25, 1959 |
| 2,903,437 | Van Epp | Sept. 8, 1959 |
| 2,944,578 | Baldwin et al. | July 12, 1960 |
| 2,970,979 | Meder et al. | Feb. 7, 1961 |

OTHER REFERENCES

Smith: "Blends of Polyvinylchloride With Rubbers," India Rubber World, volume 129, pages 785–6, March 1954.